(12) United States Patent
Cooper et al.

(10) Patent No.: US 9,865,448 B2
(45) Date of Patent: Jan. 9, 2018

(54) EXCIMER LIGHT SOURCE

(71) Applicant: Ultraviolet Sciences, Inc., San Diego, CA (US)

(72) Inventors: James Randall Cooper, San Diego, CA (US); Ronald W. Chaffee, San Diego, CA (US)

(73) Assignee: Ultraviolet Sciences, Inc., San Diego, CA (US)

( * ) Notice: Subject to any disclaimer, the term of this patent is extended or adjusted under 35 U.S.C. 154(b) by 0 days.

(21) Appl. No.: 14/609,757

(22) Filed: Jan. 30, 2015

(65) Prior Publication Data

US 2015/0136999 A1        May 21, 2015

Related U.S. Application Data

(63) Continuation of application No. 13/822,575, filed as application No. PCT/US2011/053751 on Sep. 28, 2011, now Pat. No. 8,946,662.
(Continued)

(51) Int. Cl.
*H01J 61/06*        (2006.01)
*C02F 1/32*         (2006.01)
(Continued)

(52) U.S. Cl.
CPC ............. *H01J 61/06* (2013.01); *C02F 1/325* (2013.01); *G21K 5/08* (2013.01); *H01J 61/0675* (2013.01);
(Continued)

(58) Field of Classification Search
CPC combination set(s) only.
See application file for complete search history.

(56) References Cited

U.S. PATENT DOCUMENTS 5,142,547 A    8/1992    Cirkel et al.
7,439,663 B2   10/2008   Cooper et al.
(Continued)

FOREIGN PATENT DOCUMENTS

CN    101164136 A    4/2008
CN    101489939 A    7/2009
(Continued)

OTHER PUBLICATIONS

International Search Report for International Application No. PCT/US11/53751 dated Apr. 25, 2012.
(Continued)

*Primary Examiner* — Phillip A Johnston
*Assistant Examiner* — Hsien Tsai
(74) *Attorney, Agent, or Firm* — Knobbe, Martens, Olson & Bear, LLP

(57) ABSTRACT

A light source, with electrodes of alternating polarity attached to a substrate in an excimer ultraviolet (UV) lamp, for generating a plasma discharge between each of the electrodes. The shape of the substrate can shape and control the plasma discharge to reduce exposure of materials susceptible to attack by the halogens. The electrodes can be located such that the plasma discharge occurs in a region where it produces less contact of the halogens with the vulnerable areas of the lamp enclosure. The materials, such as the electrodes, substrate, and envelope, can be selected to withstand corrosive materials. In another embodiment, a plurality of sealed tubes, at least some of which contain an excimer gas are positioned between two electrodes.

34 Claims, 4 Drawing Sheets

Related U.S. Application Data

(60) Provisional application No. 61/387,856, filed on Sep. 29, 2010.

(51) Int. Cl.
*G21K 5/08* (2006.01)
*H01J 61/16* (2006.01)
*H01J 61/067* (2006.01)
*H01J 61/073* (2006.01)
*H01J 65/04* (2006.01)
*H05B 41/24* (2006.01)
*H05B 41/30* (2006.01)
*C02F 101/30* (2006.01)

(52) U.S. Cl.
CPC .......... *H01J 61/0735* (2013.01); *H01J 61/16* (2013.01); *H01J 65/046* (2013.01); *H05B 41/24* (2013.01); *H05B 41/30* (2013.01); *C02F 2101/30* (2013.01); *C02F 2201/3227* (2013.01)

(56) References Cited

U.S. PATENT DOCUMENTS

| | | | | |
|---|---|---|---|---|
| 2001/0050937 A1* | 12/2001 | Hori | ........................ | H01S 3/038 372/55 |
| 2006/0163566 A1 | 7/2006 | Kawaraya et al. | | |
| 2008/0061669 A1 | 3/2008 | Lomaev et al. | | |
| 2009/0039757 A1 | 2/2009 | Ohshima et al. | | |
| 2009/0058299 A1* | 3/2009 | Oda | ....................... | H01J 61/125 313/607 |
| 2009/0196801 A1 | 8/2009 | Mills | | |
| 2009/0257926 A1* | 10/2009 | Schiene | .................. | C02F 1/325 422/186 |
| 2011/0117202 A1 | 5/2011 | Bourke, Jr. et al. | | |

FOREIGN PATENT DOCUMENTS

| | | |
|---|---|---|
| JP | 2005317555 A | 11/2005 |
| WO | WO 2008/010132 A2 | 1/2008 |
| WO | WO 2009139908 A1 | 11/2009 |

OTHER PUBLICATIONS

Kogelschatz. "Silent discharges for the generation of ultraviolet and vacuum ultraviolet excimer radiation." Pure & Appl. Chem., vol. 62, No. 9, pp. 1667-1674, Sep. 1990.

Office Action in Chinse Application No. 201180051962.4, dated Oct. 31, 2014.

Office Action in Chinse Application No. 201180051962.4, dated Jul. 10, 2015.

Office Action listed in Chinese Application No. 201180051962.4, dated Mar. 30, 2016.

* cited by examiner

EXCIMER LIGHT SOURCE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

This invention relates generally to gas discharge light sources.

Description of the Related Art

Volatile organic compounds and other organic chemicals are widely used as solvents, degreasers, coolants, gasoline additives, and raw materials for other synthetic organic chemicals. These organic compounds are commonly found as trace contaminants in municipal and natural water streams. As a group, they are referred to as total oxidizable carbons (TOC). These compounds are very difficult to remove by conventional means, such as filtration and absorption by media such as activated carbon.

Exposure to ultraviolet light (UV) is a means of removing TOC from water in ultra-pure water systems. The ultraviolet light for TOC removal in current commercially available systems is produced by low-pressure mercury vapor lamps operating at the 185 nm wavelength. There also exist systems using pulsed light sources that produce broad spectrum light below 250 nm. These pulsed light sources are typically xenon flashlamps. Excited dimer ("excimer") pulsed discharge lamps have also been proposed for removing TOC. Continuous discharge excimer light sources have also been proposed. Examples of these devices are disclosed in U.S. Pat. No. 7,439,663 to Cooper et al., which is incorporated herein by reference.

Excimer light sources to date use noble gas excimers (e.g., $Xe_2^*$, $Kr_2^*$, etc.) almost exclusively. The wavelengths of light which can be generated by noble gas excimers is limited, and noble gas-halogen excimers (e.g., ArF, KrCl, etc.) can generate light at some very useful wavelengths not achievable with noble gas excimers. The reason that noble gas-halogen excimers are only used in a very few applications is due in part to the fact that the halogen gases (e.g., $F_2$, $Cl_2$) that are used to form these excimers are highly reactive and chemically attack most materials used in these devices. This impedes the operation of the light source and ultimately damages it beyond repair, usually before a practical operating life time is achieved.

SUMMARY OF THE INVENTION

The system, method, and devices of the present invention each have several aspects, no single one of which is solely responsible for its desirable attributes. Without limiting the scope of this invention, its more prominent features will now be discussed briefly. After considering this discussion, and particularly after reading the section entitled "Detailed Description of the Invention" one will understand how the features of this invention provide advantages which include more cost effective water treatment.

In one embodiment, the invention comprises an ultraviolet (UV) excimer lamp comprising an envelope, an excimer gas, at least one first elongated electrode extending at least part way along the length of the envelope, and at least one second elongated electrode extending at least part way along the length of the envelope, and substantially parallel to said at least one first elongated electrode. The UV excimer lamp may comprise a substrate to which the at least one first and second elongated electrodes are attached, where the support is preferably formed of a material or materials that reflect or transmit UV light. The excimer gas in the UV excimer lamp may advantageously comprise argon fluoride.

In another embodiment, a system for treating a fluid is provided. The system may comprise a treatment chamber coupled to a fluid inlet and a fluid outlet and at least one excimer gas discharge light source wherein the light source is configured to expose a fluid passing through the treatment chamber to radiation. In this embodiment, each light source comprises an envelope, an excimer gas, at least one first elongated electrode extending along the length of the envelope, and at least one second elongated electrode extending along the length of the envelope, and substantially parallel to the at least one first elongated electrode.

Methods for purifying fluids are also provided. Such methods may comprise producing light using an excimer gas discharge light source, the light having wavelengths in the range of 100 nm-400 nm and exposing a fluid to the light. The excimer gas discharge light source used to produce the light comprises an envelope, an excimer gas, at least one first elongated electrode extending along the length of the envelope, and at least one second elongated electrode extending along the length of the envelope, and substantially parallel to the at least one first elongated electrode.

In another embodiment, a UV excimer lamp comprises at least two electrodes and a plurality of sealed tubes, at least some of which contain an excimer gas therein, the plurality of tubes positioned at least in part between the at least two electrodes.

Such a lamp may be used in a system, wherein a system for treating a fluid comprises a treatment chamber coupled to a fluid inlet and a fluid outlet and at least one excimer gas discharge light source wherein the light source is configured to expose a fluid passing through the treatment chamber to radiation. In this embodiment, the at least one excimer gas discharge light source comprises at least two electrodes and a plurality of sealed tubes, at least some of which contain an excimer gas therein, the plurality of tubes positioned at least in part between the at least two electrodes.

In addition, a method for purifying fluids of contaminants may comprise producing light using an excimer gas discharge light source, the light having wavelengths in the range of 100 nm-400 nm. In one embodiment, the excimer gas discharge light source used to produce the light comprises at least two electrodes and a plurality of sealed tubes, at least some of which contain an excimer gas therein, the plurality of tubes positioned at least in part between the at least two electrodes.

DETAILED DESCRIPTION OF THE PREFERRED EMBODIMENT

The following detailed description is directed to certain specific embodiments of the invention. However, the invention can be embodied in a multitude of different ways as defined and covered by the claims. In this description, reference is made to the drawings wherein like parts are designated with like numerals throughout.

Embodiments of the subject invention will extend the life of halogenated excimer lamps by any or all of the following: 1) limiting halogen exposure of materials susceptible to attack by the halogens, 2) locating the discharge in a region where it produces less contact between the halogens and the vulnerable areas of the lamp, 3) selecting materials which can withstand immersion in an atmosphere containing these corrosive materials, and 4) using a high frequency or pulsed AC voltage source to allow the use of insulated electrodes and to minimize acceleration of halogen ions into the electrodes.

The figures and description herein illustrate and describe structures for a light source, with elongated electrodes of alternating polarity which may be attached to a substrate in an excimer ultraviolet (UV) lamp, for generating a plasma discharge between the electrodes. The configuration of the substrate can shape and control the plasma discharge to limit exposure of materials susceptible to attack by halogens. The electrodes can be located such that the plasma discharge occurs in a region where it produces less contact between the halogens and the vulnerable areas of the lamp enclosure. The materials, such as the electrodes, support, and envelope, can also be selected to withstand corrosive materials.

Figure 1A:
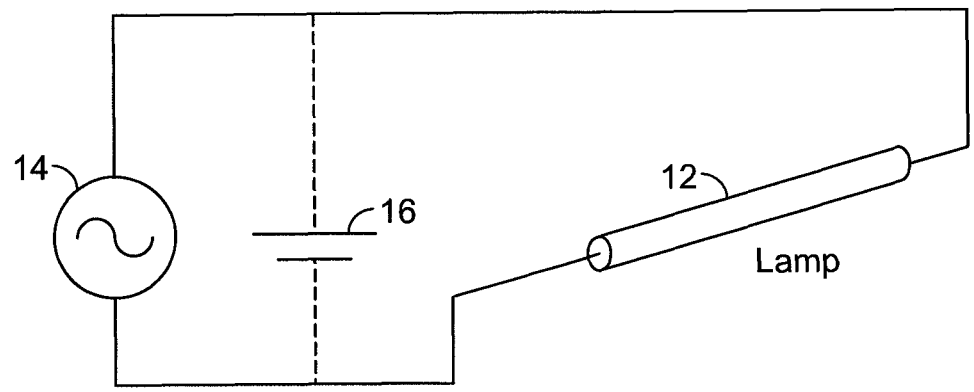
FIG. 1A depicts a system for creating a plasma discharge to generate light, the system comprising an excimer lamp and a voltage source.

FIG. 1A depicts a system for generating a plasma discharge to generate light, the system comprising a cylindrical excimer lamp 12 and a voltage source. Two voltage sources are illustrated, an AC voltage source 14, and an alternative DC voltage source 16. Thus, an AC, DC, or pulsed voltage source is connected to, and can drive, opposite ends of the lamp. As described further below, the AC and pulsed voltage sources can drive electrodes that are bare or insulated, whereas the DC voltage source typically only drives bare electrodes.

Figure 1B:
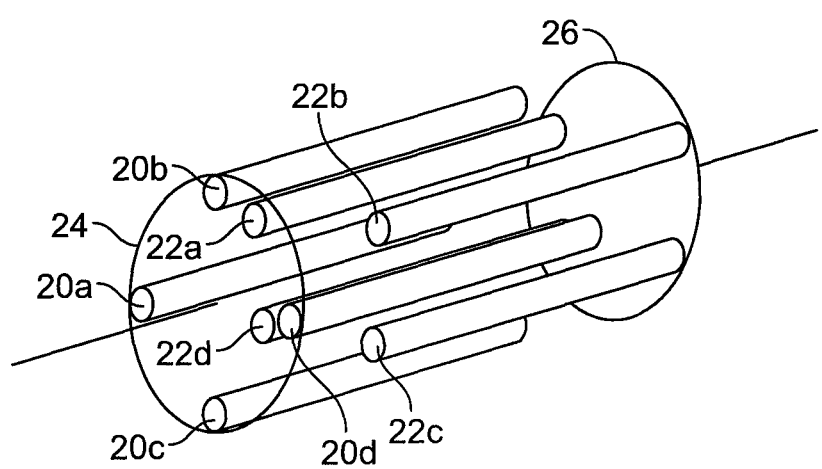
FIG. 1B depicts the internal construction of a cylindrical excimer lamp which may be used in an embodiment of the system as depicted in FIG. 1A.

FIG. 1B depicts the internal construction of a cylindrical excimer lamp which may be used in an embodiment of the system as depicted in FIG. 1A. The lamp typically comprises an envelope that contains the gas, but that envelope is not shown for simplicity such that the electrodes in the lamp can be more easily seen. As shown, there are two sets of four electrodes connected to respective sides of the voltage source at each end of the lamp. One set is denoted 20a-20d, and the other set is denoted 22a-22d. Thus, each electrode in a set is attached to one side of the voltage source via a first contact electrode 24 for electrodes 20a-20d, and a second contact electrode 26 on the other side for electrodes 22a-22d, and thus each electrode in a given set is tied to the same voltage. The first set of electrodes are connected to one side of the voltage source at their proximal ends and extend from that side along the length of the lamp. The first set of electrodes is not connected to the other side of the voltage source at their distal ends. The second set of electrodes connected to other side of the voltage source at their proximal ends extend from that side along the length of the lamp substantially in parallel with the first set of electrodes and are not connected to the other side of the voltage source (which is connected to the first set) at their distal ends. This produces interleaved parallel electrode pairs that have opposite polarity and that can support a plasma discharge therebetween. In various embodiments, the spacing between the electrodes is between about a micrometer and a few millimeters. The electrode shape may advantageously be such that the electric field is constant over most of the axial distance and does not exceed this value by a large amount at any position, particularly at the unconnected end. An AC, DC, or pulsed voltage can be applied between each pair of alternating polarity electrodes to create a stable electrical discharge in the surrounding gas mixture. The gas pressure should be high enough to allow efficient excimer generation, a three-body process. Preferentially it should not be below 0.1 Torr, or above 5000 Torr, but can be as high as the mechanical structure of the gas envelope allows. The discharge plasma occurs between each of the alternating polarity electrodes. Although the connections between the wires and respective sides of the power supply are advantageously made at opposite ends of the lamp, it would be possible to have different polarity wires connected to separate power supply outputs at the same side of the lamp as well.

In the embodiment of FIG. 1, the lamp is an elongated cylinder. For example, the lamp may in some embodiments be about 5 mm-50 mm in diameter and up to about six feet in length. Although not shown, a chamber filled with water to be purified can surround the lamp. The chamber can preferentially contain a UV transmissive sleeve which isolates the lamp from direct contact with the water. The sleeve may be designed to allow the lamp to be easily removed for replacement. Thus, the principles described herein may be used to produce a discharge lamp with an advantageous physical configuration for purifying water.

Discharge lamps having the structure shown in FIG. 1 can contain a variety of excimer gases. For example, a xenon excimer lamp produces UV output at 172 nm. This wavelength penetrates about 0.1 mm (decreases in about 0.1 mm to 1/e of its initial value) through water. Because the absorbance of water drops dramatically between 175 and 200 nm, it can be advantageous to use slightly longer wavelengths when using UV lamps to purify water. Halogen excimer gases can provide these wavelengths. For example, argon fluoride has a slightly longer wavelength (193 nm), which is slightly less energetic, but decreases in about 10 cm to 1/e of its initial value, and therefore can penetrate water over a much larger distance than Xe excimer radiation. However, the fluorine gas required to generate argon fluoride is very corrosive, and can attack and ultimately destroy the lamp components. These effects are minimized by employing the embodiments described below. Thus, the principles described herein can also be used to produce a halogen discharge UV light source having advantageous wavelength output for purifying water that has a long lifetime. A variety of halogenated gases can be used in the lamps described herein. In addition to argon fluoride with a wavelength of 193 nm, the lamp may contain krypton fluoride at a 248 nm wavelength or krypton iodide at a 184 nm wavelength. Other possibilities include krypton chloride and argon chloride. It will be appreciated that any halogenated gas or gas mixture can be used advantageously with the lamp designs described herein, which, depending on the gas, could produce output wavelength or wavelengths from, for example, about 170 nm to about 310 nm.

In FIGS. 2 through 8 seven different physical lamp layouts are described along with some options for materials for the components comprising those structures. Each of these structures can be contained in a UV transmissive envelope, and the structures in FIGS. 2-8 are illustrated as being surrounded by a cylindrical UV transmissive envelope 30.

The spacing between the electrodes and the pressure of the fill gas 32 in the lamps may be such that the pressure of the gas mixture multiplied by the smallest distance between the electrodes, or the smallest distance between the two coated surfaces covering the electrodes is in the range 0.1-5000 Torr-cm. Further, the spacing between the two electrodes, or the smallest distance between the two coated surfaces covering the electrodes is normally less than 1 mm in such a microdischarge structure.

The envelope that surrounds the substrate and the electrodes may be cylindrical, sealed, light transmissive, and made from or coated with one or more of the substrate materials such that the light transmissive envelope is resistant to the corrosive effects of the gas mixture contained within.

Figure 2:
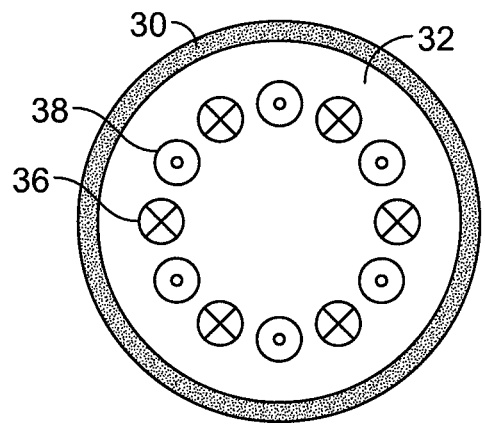
FIG. 2 illustrates two sets of six electrodes in accordance with several embodiments of the invention.

FIG. 2 illustrates a cross section of a structure with an array of two sets of six electrodes with alternating voltage polarity, arranged in a circle, surrounded by a UV transmissive envelope, in accordance with several embodiments of the invention. One set of electrodes are connected to one side of the voltage source and the other set of electrodes are connected to the other side of the voltage source. For convention, electrodes 36 designated by "x" represent one polarity, whereas the electrodes 38 designated by "o" represent the opposite polarity. These two sets of electrodes have a potential difference between them, creating a plasma discharge between adjacent opposite polarity electrodes.

The electrodes in FIG. 2 may be bare or insulated. Examples of bare and insulated materials that resist halogen corrosion include: bare refractory metal, bare molybdenum, bare hafnium, bare hafnium coated/plated metal, bare nickel plated metal, PTFE insulated electrode, $MgF_2$ insulated electrode, $CaF_2$ insulated electrode, $Al_2O_3$ insulated electrode and $TiO_2$ insulated electrode. They also may be made of resistive material, such as carbon composites, or dielectric material coated with thin layers of corrosion resistant metal.

If the electrodes are bare, the electrode material or coating (e.g., the electrode materials discussed above) may be selected that resist corrosion by the gas mixture. In one embodiment, the electrodes are bare. Non-insulated electrodes can be used with AC, DC, or pulsed voltage. If the electrodes are insulated, the discharge voltage is provided from a pulsed or AC source. For AC or pulsed sources, a higher frequency or a shorter pulse width provided to the electrodes can minimize the acceleration of halogen ions into the electrodes. In one embodiment, the voltage source delivers voltage from below radio frequencies to microwave frequencies (e.g., between about 20 kHz and about 300 GHz). A high frequency AC voltage source (e.g., over 100 MHz) accelerates the free electrons in the plasma but does not appreciably accelerate the heavy halogen ions, such that these ions are not undesirably accelerated into structural elements of the lamp. Instead, the fluorine ions only slowly drift into the lamp structures, which reduces the rate of corrosion in comparison to ions accelerated into the structures. Corrosion is a problem because it breaks down essential properties of the structure, which react with the halogen atoms, depleting the halogen concentration and reducing the excimer light output of the lamp. Thus, the lifetime of a lamp can be improved when operated at high frequency, because free electrons are accelerated to a high velocity by the field, but the heavy ions are not accelerated into the lamp materials.

Figure 3:
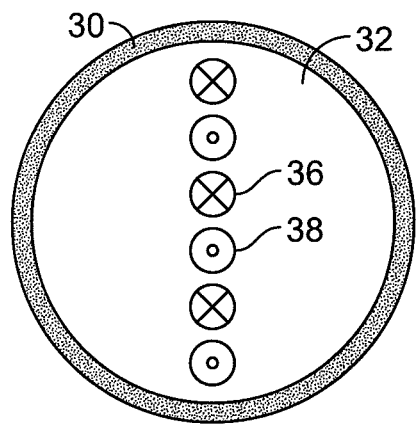
FIG. 3 illustrates a linear design of two sets of three electrodes.

FIG. 3 illustrates a linear design structure of two sets of electrodes 36, 38. Unlike the previous figures, which illustrate a circular array of electrodes, this figure shows a basic linear design structure. Although shown with a cylindrical envelope, a rectangular or sheet shaped envelope is suitable with this electrode arrangement.

Figure 4:
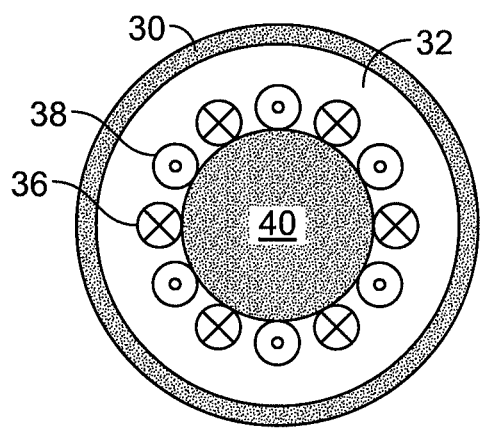
FIG. 4 illustrates two sets of six electrodes attached to a substrate.

The electrode arrangements may be physically supported by a substrate 40 to improve practicability and durability. FIG. 4 shows one such option for supporting a circular arrangement of the electrodes. This figure illustrates two sets of six electrodes attached to a substrate 40. The substrate can be made from a substantially UV transmissive or reflective material that is also resistant to the corrosive effects of the gas mixture. The substrate can be halogen resistant and transmit or reflect (not absorb) UV light below 300 nm (and in particular, below 200 nm). Examples of substantially transmitting and reflecting materials that can be used for a substrate include: magnesium fluoride ($MgF_2$), calcium fluoride, barium fluoride, lithium fluoride, PTFE, titanium dioxide ($TiO_2$), and/or alumina/sapphire ($Al_2O_3$).

The envelope 30 that surrounds the substrate 40 and the electrodes 36, 38 may be cylindrical, or another arbitrary, closed shape, sealed, light transmissive, and made from or coated with one or more of the substrate materials such that the light transmissive envelope is resistant to the corrosive effects of the gas mixture contained within.

Figure 5:
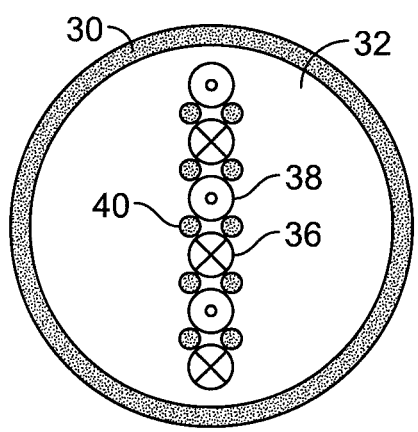
FIG. 5 illustrates a linear design of two sets of three electrodes with substrate support.

FIG. 5 illustrates a linear design structure of two sets of electrodes with substrate 40 support. The substrate 40 provides additional support to the electrodes.

Figure 6:
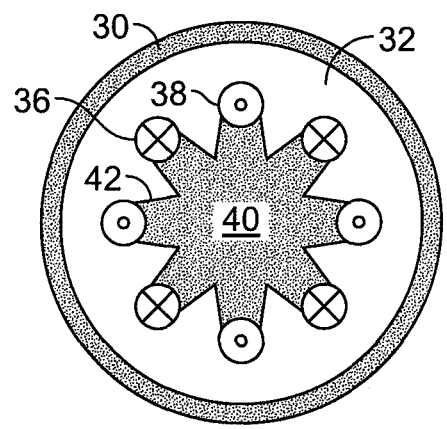
FIG. 6 illustrates two sets of four electrodes attached to a substrate with cavities formed between the electrodes.

FIG. 6 illustrates two sets of four electrodes attached to a substrate 40 with cavities formed between the electrodes. This figure illustrates a further refinement, where the substrate 40 is shaped to have grooves 42 that form cavities between the electrode locations to shape and contain the plasma discharge, as well as to minimize the contact of the plasma with the substrate material. Furthermore, there is very little plasma discharge adjacent to the sealed, light transmissive envelope. This reduces the potential corrosion of the envelope due to the discharge. The cavities can be shaped as needed to provide the best performance. As in the other figures, a voltage discharge is created between the electrodes. In this figure, eight discharges are created, one discharge between each adjacent pair of electrodes.

Figure 7:
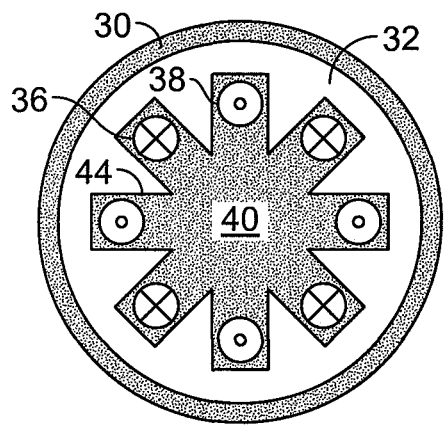
FIG. 7 illustrates two sets of four electrodes embedded in a substrate.

FIG. 7 illustrates two sets of four electrodes embedded in a substrate 40. In this alternative construction, the electrodes are embedded within the substrate, where the substrate either transmits or reflects (but does not appreciably absorb) the light generated by the plasma discharge. Also, as described above, the substrate is configured such that a cavity 44 is created to shape and control the plasma discharge. The cavities 44 can also serve to minimize the contact of the plasma with the envelope.

Figure 8:
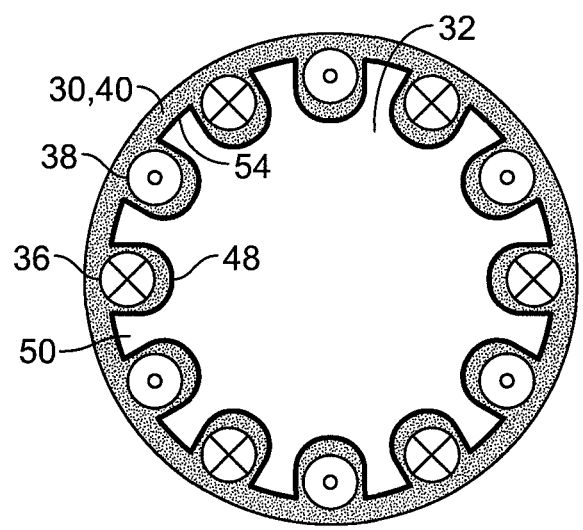
FIG. 8 illustrates electrodes embedded in inwardly extending portions of a sealed envelope.

It is further possible for the substrate 40 and the envelope 30 to be formed as a single structure with the electrodes embedded therein. In these embodiments, an excimer gas filled central region 32 of a hollow substrate can form the discharge region. Such an embodiment is illustrated in FIG. 8. In this embodiment, the electrodes are embedded in inwardly extending portions 48 of a hollow, sealed envelope. The excimer gas is present in the internal hollow cavity. Discharges are generated in the hollow cavity in the regions 50 between the inwardly extending portions in which the electrodes are embedded.

In some advantageous embodiments, the envelope/substrate is made of quartz. As shown in FIG. 8, the inner surface of this envelope/substrate can have a coating 54 with the transmissive substrate materials described above. The embodiment of FIG. 8 can be produced by placing each electrode inside a small tube, and then arranging each of these coated electrodes around the inner surface of a larger tube. A heat treatment can then be used to fuse the small tubes to the inner surface of the larger tube. Prior to heat treatment, the small tubes could be help in place with a central mold that has a higher thermal coefficient of expansion than the tube materials. The central mold can be slid inside the larger tube with the smaller tubes on the inner surface thereof, and during the heat treatment, the central mold can expand against the smaller tubes, pressing them against the inner surface of the larger tube. After cooling, the central mold can be slid back out. Although a variety of materials may be used as the envelope in this embodiment, quartz is advantageous. After the heat treatment, a coating 54 of, for example, magnesium fluoride ($MgF_2$), calcium fluoride ($CaF_2$), barium fluoride ($BaF_2$), lithium fluoride (LiF), PTFE, titanium dioxide ($TiO_2$), and/or alumina/sapphire ($Al_2O_3$) may be provided on the inners surface to enhance longevity depending on the excimer gas being used. This embodiment is advantageous due to its simple, essentially single piece construction.

Figure 9:
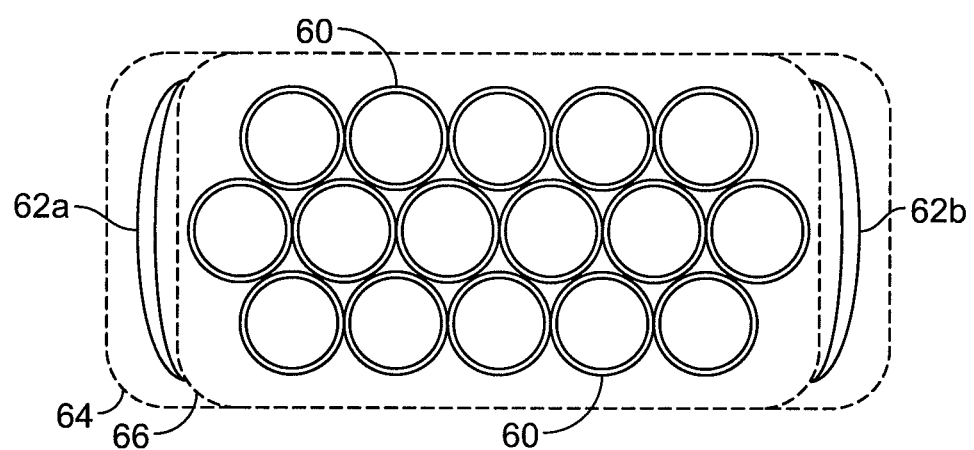
FIG. 9 illustrates another embodiment of a gas discharge light source, comprised of UV-transmissive cylinders filled with an excimer gas, with external electrodes producing an electrical discharge within those cylinders.

FIG. 9 illustrates another embodiment an array of two or more tubes 60 that are filled with an excimer discharge gas. The tubes 60 are shown as cylinders in this case, but could be of any arbitrary shape. The tubes are filled with the excimer gas, to the proper pressure, then sealed. A pulsed or AC voltage is then applied by electrodes 62a and 62b to produce a transverse electric field across the tubes, which leads to an electrical discharge inside the tubes. Two electrodes are shown, but it may be advantageous to intersperse more electrodes in between the elements of the array of tubes to enhance breakdown performance. The electrodes 62a, 62b may be bare metal or may be covered with a reflective and/or electrically insulating coating to prevent absorption of the light generated inside the tubes and to ensure that there is less likelihood of electrical breakdown between the opposing electrodes. The electrodes need not fully encompass or surround the tubes, they need only be of sufficient size and location with respect to the tubes to be capable of causing excimer discharge therein.

The transverse distance across the tube and the gas pressure inside the tubes are such that the pressure times distance product is in the range 0.1-5000 Torr-cm for proper microdischarge operation. The tubes themselves can be made from a variety of materials. In this embodiment, quartz is advantageous. The tubes may include a coating of, for example, magnesium fluoride ($MgF_2$), calcium fluoride ($CaF_2$), barium fluoride ($BaF_2$), lithium fluoride (LiF), PTFE, titanium dioxide ($TiO_2$), and/or alumina/sapphire ($Al_2O_3$), which may be provided on the inner surface of the tube to enhance longevity, depending on the excimer gas being used. Other embodiments may use one or more of these coating materials to form the complete tubes, eliminating the need for a separate coating step. The entire assembly may or may not be contained within an outer, UV transmissive envelope, shown alternatively as 64 and 66 for handling protection and/or gas or liquid cooling purposes. As shown by the two possibly envelope configurations in FIG. 9, the electrodes in a device with an outer envelope can be either inside (e.g. with envelope 64) or outside the envelope (e.g with envelope 66).

This embodiment can be advantageous because the sealed tubes can contain only or essentially only gas, with no electrodes or other functional materials or components inside (other than the inside surface of the tube, which may be coated as described above) that come into contact with and may be degraded by the excimer gas. This provides for a long lasting UV lamp with a simple and inexpensive construction.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. For example, it may be advantageous to use the electrodes as ballast resistors. If this is done, the lamp can be cooled by running water through one of more channels extending axially through the body of the substrate. The scope of the invention is indicated by the appended claims rather than by the foregoing description. All changes which come within the meaning and range of equivalency of the claims are to be embraced within their scope.

What is claimed is:

1. An ultraviolet (UV) excimer lamp comprising:
an envelope;
an excimer gas contained within an interior section of the envelope;
at least one first elongated electrode positioned within the interior section of the envelope and extending along the length of the envelope; and
at least one second elongated electrode positioned within the interior section of the envelope and extending along the length of the envelope, and substantially parallel to said at least one first elongated electrode,
wherein the at least one first elongated electrode and the at least one second elongated electrode have a potential difference between them, the potential difference creating a plasma discharge between the at least one first elongated electrode and the at least one second elongated electrode;
wherein the at least one first elongated electrode and the at least one second elongated electrode or one or more substrates to which the at least one first elongated electrode and at least one second elongated electrode are attached comprise or are coated with a material resistant to halogen erosion;
wherein a pressure of the excimer gas multiplied by a smallest distance between the first elongated electrode and the second elongated electrode or a smallest distance between a coated surface covering the first elongated electrode and a coated surface covering the second elongated electrode is in the range of 0.1 Torr-cm to 5000 Torr-cm.

2. The UV excimer lamp of claim 1 further comprising a support to which the at least one first and second elongated electrodes are attached.

3. The UV excimer lamp of claim 2, wherein the support reflects or transmits UV light.

4. The UV excimer lamp of claim 2, wherein the envelope and the support are formed as a single piece of material.

5. The UV excimer lamp of claim 1, wherein the excimer gas comprises a noble gas, a halogen, or a mixture thereof.

6. The UV excimer lamp of claim 5, wherein the excimer gas comprises a noble gas selected from argon, krypton, and xenon, mixed with a halogen selected from chlorine, bromine, fluorine, and iodine.

7. The UV excimer lamp of claim 6, wherein the excimer gas comprises krypton fluoride.

8. The UV excimer lamp of claim 6, wherein the excimer gas comprises krypton chloride.

9. The UV excimer lamp of claim 6, wherein the excimer gas comprises argon fluoride.

10. The UV excimer lamp of claim 1, wherein at least one of the first and second elongated electrodes are insulated.

11. The UV excimer lamp of claim 1 further comprising a voltage source connected across said first and second elongated electrodes.

12. The UV excimer lamp of claim 11, wherein the voltage source comprises a pulsed voltage source.

13. The UV excimer lamp of claim 12, wherein the pulse frequency is from about 20 kHz to about 300 GHz.

14. The UV excimer lamp of claim 11, wherein the voltage source comprises an AC voltage source.

15. The UV excimer lamp of claim 14, wherein the frequency of the AC voltage is from about 20 kHz to about 300 GHz.

16. A system for treating a fluid comprising:
a treatment chamber coupled to a fluid inlet and a fluid outlet; and
at least one excimer gas discharge light source wherein the light source is configured to expose a fluid passing through the treatment chamber to radiation,
wherein each light source comprises:
an envelope;
an excimer gas contained within an interior section of the envelope;
at least one first elongated electrode positioned within the interior section of the envelope and extending along the length of the envelope; and
at least one second elongated electrode positioned within the interior section of the envelope and extending along the length of the envelope, and substantially parallel to said at least one first elongated electrode,
wherein the at least one first elongated electrode and the at least one second elongated electrode have a potential difference between them, the potential difference creating a plasma discharge between the at least one first elongated electrode and the at least one second elongated electrode;
wherein the at least one first elongated electrode and the at least one second elongated electrode or one or more substrates to which the at least one first elongated electrode and at least one second elongated electrode are attached comprise or are coated with a material resistant to halogen erosion;
wherein a pressure of the excimer gas multiplied by a smallest distance between the first elongated electrode and the second elongated electrode or a smallest distance between a coated surface covering the first elongated electrode and a coated surface covering the second elongated electrode is in the range of 0.1 Torr-cm to 5000 Torr-cm.

17. The system of claim 16, wherein said treatment chamber surrounds the envelope.

18. The system of claim 17, wherein the treatment chamber comprises a sleeve isolating the fluid from contact with the envelope.

19. The system of claim 16, wherein the excimer gas comprises a noble gas, a halogen, or a mixture thereof.

20. The system of claim 19, wherein the excimer gas comprises argon fluoride.

21. The system of claim 19, wherein the excimer gas comprises krypton fluoride.

22. The system of claim 19, wherein the excimer gas comprises krypton chloride.

23. A method for purifying fluids of contaminants comprising:
producing light using an excimer gas discharge light source, the light having wavelengths in the range of 100 nm-400 nm; and
exposing a fluid to the light,
wherein the excimer gas discharge light source used to produce the light comprises:
an envelope;
an excimer gas contained within a closed interior section of the envelope;
at least one first elongated electrode positioned within the closed interior section of the envelope and extending along the length of the envelope; and
at least one second elongated electrode positioned within the closed interior section of the envelope and extending along the length of the envelope, and substantially parallel to said at least one first elongated electrode,
wherein the at least one first elongated electrode and the at least one second elongated electrode have a potential difference between them, the potential difference creating a plasma discharge between the at least one first elongated electrode and the at least one second elongated electrode;
wherein the at least one first elongated electrode and the at least one second elongated electrode or one or more substrates to which the at least one first elongated electrode and at least one second elongated electrode are attached comprise or are coated with a material resistant to halogen erosion;
wherein a pressure of the excimer gas multiplied by a smallest distance between the first elongated electrode and the second elongated electrode or a smallest distance between a coated surface covering the first elongated electrode and a coated surface covering the second elongated electrode is in the range of 0.1 Torr-cm to 5000 Torr-cm.

24. The method of claim 23, wherein the gas discharge light source produces light predominantly having a wavelength between about 170 nm and 310 nm.

25. The method of claim 24, wherein the gas discharge light source produces light predominantly having a wavelength of about 193 nm.

26. The method of claim 24, wherein the gas discharge light source produces light predominantly having a wavelength of about 222 nm.

27. The method of claim 24, wherein the gas discharge light source produces light predominantly having a wavelength of about 248 nm.

28. The method of claim 23, wherein the fluid consists essentially of water.

29. The UV excimer lamp of claim 1, wherein the material resistant to halogen erosion comprises one or more of bare refractory metal, bare molybdenum, bare hafnium, bare hafnium coated/plated metal, bare nickel plated metal, PTFE, $MgF_2$, $CaF_2$, $BaF_2$, LiF, $Al_2O_3$, and $TiO_2$.

30. The UV excimer lamp of claim 29, wherein at least one of the at least one first elongated electrode and at least one second elongated electrode comprises a PTFE insulated electrode, an MgF$_2$ insulated electrode, a CaF$_2$ insulated electrode, an Al$_2$O$_3$ insulated electrode, or a TiO$_2$ insulated electrode.

31. The system of claim 16, wherein the material resistant to halogen erosion comprises one or more of bare refractory metal, bare molybdenum, bare hafnium, bare hafnium coated/plated metal, bare nickel plated metal, PTFE, MgF$_2$, CaF$_2$, BaF$_2$, LiF, Al$_2$O$_3$, and TiO$_2$.

32. The system of claim 31, wherein at least one of the at least one first elongated electrode and at least one second elongated electrode comprises a PTFE insulated electrode, an MgF$_2$ insulated electrode, a CaF$_2$ insulated electrode, an Al$_2$O$_3$ insulated electrode, or a TiO$_2$ insulated electrode.

33. The method of claim 23, wherein the material resistant to halogen erosion comprises one or more of bare refractory metal, bare molybdenum, bare hafnium, bare hafnium coated/plated metal, bare nickel plated metal, PTFE, MgF$_2$, CaF$_2$, BaF$_2$, LiF, Al$_2$O$_3$, and TiO$_2$.

34. The method of claim 33, wherein at least one of the at least one first elongated electrode and the at least one second elongated electrode comprises a PTFE insulated electrode, an MgF$_2$ insulated electrode, a CaF$_2$ insulated electrode, an Al$_2$O$_3$ insulated electrode, or a TiO$_2$ insulated electrode.

* * * * *